United States Patent
Ramberg et al.

(10) Patent No.: US 9,600,707 B1
(45) Date of Patent: Mar. 21, 2017

(54) ANALOG SAMPLING SYSTEM AND METHOD FOR NOISE SUPRESSION

(71) Applicant: Fingerprint Cards AB, Göteborg (SE)

(72) Inventors: Fredrik Ramberg, Göteborg (SE); Hans Thörnblom, Kungsbacka (SE); David Carling, Mölndal (SE); Frank Robert Riedijk, Delft (NL)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/196,617

(22) Filed: Jun. 29, 2016

(30) Foreign Application Priority Data

Nov. 30, 2015 (SE) .................................... 1551553-9

(51) Int. Cl.
*G06F 3/045* (2006.01)
*G06K 9/00* (2006.01)

(52) U.S. Cl.
CPC .......... *G06K 9/0002* (2013.01); *G06F 3/045* (2013.01); *G06K 9/00053* (2013.01)

(58) Field of Classification Search
None
See application file for complete search history.

(56) References Cited

U.S. PATENT DOCUMENTS

| 7,864,992 B2* | 1/2011 | Riedijk | G06K 9/0002 382/124 |
| 8,888,004 B2 | 11/2014 | Setlak et al. | |
| 2010/0103120 A1* | 4/2010 | Fann | G06F 3/0416 345/173 |
| 2012/0217981 A1* | 8/2012 | Erdogan | G01R 27/2605 324/679 |

* cited by examiner

*Primary Examiner* — Jennifer Mehmood
*Assistant Examiner* — Stephen T Reed
(74) *Attorney, Agent, or Firm* — Remarck Law Group PLC

(57) ABSTRACT

There is provided a capacitive fingerprint sensing device comprising a plurality of sensing elements, sensing circuitry for providing an analog sensing signal, drive signal circuitry providing a drive signal comprising a drive pulse having a maximum level and a minimum level, providing a change in potential difference between the finger and the sensing structure, analog sampling circuitry comprising at least three analog sample and hold circuits arranged to sample the sensing signal, and a sampling control unit for individually controlling the sample and hold circuits to capture a sample at a specified time, wherein the samples comprises one sample captured when the drive signal is at a first voltage level $V_1$ and one sample captured when the drive signal is at a second voltage level $V_2$, different from $V_1$; and an analog-to-digital converter, ADC, configured to convert a combination of the samples into a digital signal, wherein the three samples are captured times such that a noise component is suppressed from the sensing signal when the combination is formed.

22 Claims, 8 Drawing Sheets

ANALOG SAMPLING SYSTEM AND METHOD FOR NOISE SUPRESSION

CROSS REFERENCE TO RELATED APPLICATIONS

This application claims the benefit of Swedish Patent Application No. 1551553-9 filed Nov. 30, 2015. The disclosure of the above application is incorporated herein by reference in its entirety.

FIELD

The present invention relates to a capacitive fingerprint sensing system and to a method of sensing a fingerprint pattern.

BACKGROUND

Various types of biometric systems are used more and more in order to provide for increased security and/or enhanced user convenience.

In particular, fingerprint sensing systems have been adopted in, for example, consumer electronic devices, thanks to their small form factor, high performance, and user acceptance.

Among the various available fingerprint sensing principles (such as capacitive, optical, thermal etc), capacitive sensing is most commonly used, in particular in applications where size and power consumption are important issues.

All capacitive fingerprint sensors provide a measure indicative of the capacitance between each of several sensing structures and a finger placed on or moved across the surface of the fingerprint sensor.

As capacitive fingerprint sensing devices are required to detect ever smaller capacitive differences in order to accurately capture a fingerprint image, the influence of noise in the sensor is becoming increasingly important. In particular, the fingerprint sensing device is particularly sensitive to externally injected common mode noise. Typically, this type of noise can be injected to the fingerprint sensor through a charger connected to a device in which the fingerprint sensor is located. Moreover, common mode noise can have a large spread in frequency and shape. The injected common mode noise signal can make the system ground to swing in reference to the finger thereby looking like drive signal. This results in corrupt measurements and poor image quality.

The negative impact of common mode noise can be reduced by implementing various noise reduction techniques. One example of a method for common mode noise suppression is to take the average of a number of digital readings from each pixel to reduce the influence of noise. However, ADC-conversion is time consuming and it is not desirable to increase the time it takes to capture a fingerprint image. Alternatively, or in combination, it is possible to use post-processing methods which runs through the captured fingerprint image and tries to subtract characteristic common mode noise. However, a disadvantage of this method is that measurement values might be corrupted in case of saturation during the analog sampling, in which case it may be difficult or impossible to cancel the influence of noise.

Accordingly, there is a need provide improved means for handling noise in a capacitive fingerprint sensing device.

SUMMARY

In view of above-mentioned and other drawbacks of the prior art, it is an object of the present invention to provide a fingerprint sensing device comprising analog sampling circuitry for facilitating noise suppression during capture of a fingerprint image. There is also provided a method for noise suppression in a fingerprint sensing device.

According to a first aspect of the invention, there is provided a capacitive fingerprint sensing device for sensing a fingerprint pattern of a finger, the capacitive fingerprint sensor comprising a plurality of sensing elements, each sensing element comprising: a protective dielectric top layer to be touched by the finger; an electrically conductive sensing structure arranged underneath the top layer; sensing circuitry for providing an analog sensing signal indicative of a distance between the finger and the sensing structure, the fingerprint sensing device further comprising: drive signal circuitry configured to provide a drive signal comprising at least one drive pulse having a maximum voltage level and a minimum voltage level for providing a change in potential difference between the finger and the sensing structure; analog sampling circuitry comprising at least three analog sample and hold circuits arranged to sample the sensing signal, and a sampling control unit for individually controlling each of the at least three analog sample and hold circuits to capture a sample at a specified time, thereby forming at least three samples, wherein the at least three samples comprises at least one sample captured when the drive signal is at a first voltage level $V_1$ and at least one sample captured when the drive signal is at a second voltage level $V_2$, different from $V_1$; and an analog-to-digital converter, ADC, connected to the analog sampling circuitry and configured to convert a combination of the at least three samples into a digital sensing signal indicative of a capacitive coupling between the sensing structure and the finger, wherein the at least three samples are captured at the specified times such that a noise component is suppressed from the sensing signal when the combination is formed.

In the context of the present application, the term "potential" should be understood to mean "electrical potential".

A change in potential difference should, accordingly, be understood to mean a time variable change in an electrical potential, in relation to a reference potential, between the finger and the sensing structure.

The sensing elements may advantageously be arranged in an array comprising rows and columns.

Each sensing structure may advantageously be provided in the form of a metal plate, so that the equivalence of a parallel plate capacitor is formed by the sensing structure (the sensing plate), the local finger surface, and the protective dielectric top layer (and any air that may locally exist between the local finger surface and the protective layer depending on location in the fingerprint pattern). A change of the charge carried by the sensing structure resulting from the change in potential difference between the finger and the sensing structure is an indication of the capacitance of this parallel plate capacitor, which is in turn an indication of the distance between the sensing structure and the finger surface.

The protective top layer, which also may be referred to as a coating, may advantageously be at least 20 µm thick and have a high dielectric strength to protect the underlying structures of the fingerprint sensing device from wear and tear as well as from ESD. Even more advantageously, the protective top layer may be approximately 100 µm thick. In some embodiments, the protective coating may be in the range of 500-700 µm thick, or even thicker.

Each sensing element may be controllable to perform a predetermined measurement sequence involving transitioning between different measurement states in a predetermined sequence. A measurement state may be defined by a certain combination of control signals provided to the circuitry comprised in the sensing element.

The drive signal circuitry may comprise switching circuitry configured to switch between two or more different potentials, to form the at least one drive pulse having a maximum voltage level and a minimum voltage level. Alternatively or in combination, the drive signal circuitry may comprise at least one signal source configured to provide the time-varying excitation potential.

The drive signal circuitry may be included in a fingerprint sensor component, and may then provide the drive signal having the time-varying excitation potential in relation to a reference potential of the fingerprint sensor component, for example a sensor ground potential.

Alternatively, the drive signal circuitry may be provided externally to the fingerprint sensor component and be connected to the fingerprint sensor component to provide the drive signal as a time-varying reference potential for the fingerprint sensor component. In this case, the drive signal may exhibit its time-varying drive potential in relation to a device ground potential of the electronic device in which the fingerprint sensing system is included. External drive signal circuitry may be controlled using control signals generated by timing circuitry comprised in the fingerprint sensor component. The drive signal circuitry may also be referred to as excitation signal circuitry.

The combination of the at least three samples should be seen as an addition or subtraction of samples such that the combination of the samples effectively form a filtered sensing signal. For example, the combination may be a difference between a first sub-group of samples and a second sub-group of samples, the first and second subgroup being disjoint, i.e. having no samples in common.

Each sample can be considered to have an amplitude representing the sensing signal at the sampling time. Moreover each sample and hold circuit is configured to provide either a positive or negative (ground) reference voltage such that the sample can be seen as having either a positive or a negative sign, thereby enabling the filtering functionality when the samples are combined.

Thus, by combining "positive" and "negative" samples captured at different times, and for different voltage levels of the drive signal, a resulting sensing signal can be achieved. For each AD-conversion, a number of analog samples are captured and subsequently combined to form a sensing signal value to be AD-converted. Such a series of samples can be seen as an AD conversion sequence.

Furthermore, the present invention is based on the realization that by selecting the times when the samples are captured in relation to the drive signal and by combining the samples, a resulting filtered and demodulated sensing signal can be achieved to reduce common mode noise in the sensing signal prior to AD-conversion.

Thus, in the sensing device according to various embodiments of the present invention, analog filtering is performed prior to AD-conversion, thereby enabling real time filtering independent of the sampling rate of the AD-converter. This is particularly advantageous since AD-conversion takes time, and it is desirable to capture a fingerprint as fast as possible. Even though it n principle is possible to use a high speed AD-converters to and to perform digital filtering of the digital signal to achieve similar results, such AD-converters can be complex and expensive to integrate in a fingerprint sensing device.

Moreover, it has been realized that three samples are sufficient to achieve basic filter functionality, as will be illustrated in the following. Using a larger number of sample and hold circuits to capture a corresponding larger number of samples further facilitates the construction of higher order filters, making it possible to construct more well-defined low-pass (LP), high-pass (HP) or band-pass (BP) filters having the desired frequency response according to established filter theory.

A further advantage of having a filter where it is possible to use more than one drive pulse is that no signal strength is lost. Taking 50 Hz noise as an example, half of the signal strength will be lost if only one drive pulse is used. Another advantage of the flexibility of the filter is that it may readily be adapted for different types of common mode noise, which is often different for different types devices depending on the load, charger type, grounding etc.

The sampling circuitry can be controlled by predefined hardware settings determining when each sample is captured in relation to the drive signal, or the sampling events can be controlled individually for each separate AD-conversion sequence. For noise having unknown properties, the sampling circuitry can be configured to test a number of predefined settings and to determine which of the settings produce the output signal having the lowest noise level, and the preferred setting can then be uses in subsequent AD-conversion sequences.

According to one embodiment of the invention, the analog sampling circuitry may advantageously be configured to sample the sensing signal at selected points in time based on a known property of a noise component such that the noise component is suppressed. The general principle of the sampling is to select the samples such that the resulting combination of samples results in an effective suppression or cancellation of the noise contribution to the sensing signal. Known noise sources can for example, be the charger, which may add a low frequency (50/60 Hz) sinusoidal noise from the mains voltage, or a high frequency switching noise from the charger itself, where the switching frequency can be considered to be known. Another known source of noise can be the touchscreen in a device such as a smartphone or tablet computer. Accordingly, it is possible to configure the drive signal circuitry and sampling circuitry to suppress specific types of noise having at least partially known properties.

According to one embodiment of the invention, each sample and hold circuit may advantageously comprise a capacitor and a switch controlling the capacitor. A capacitor-based sample and hold circuit provides a straightforward and easily implemented circuit where the switch is controlled by the sampling circuitry to sample at the required times. Each capacitor can be connected to a positive or negative reference potential to provide a corresponding positive and negative offset to the sample voltage. The negative reference potential is typically a ground potential.

According to one embodiment of the invention, the analog sampling circuitry may comprise an even number of sample and hold circuits, each sample and hold circuit comprising a capacitor and a switch controlling the capacitor, wherein all capacitors have the same size. Thereby, the sample and hold circuit is equivalent can be controlled without the need to consider which sample and hold circuit is used for which sampling event in time. Moreover, for an even number of sample and hold circuits, half of the circuits can be connected to a positive reference and the other half can be connected to a negative reference, which provides a large flexibility in constructing the filter functionality.

According to one embodiment of the invention, the sampling control unit is advantageously configured to control the sample and hold circuits to sample such that an equal number of samples are captured at the first voltage level and at the second voltage level of the drive signal. For example, the samples captured at the first voltage level can be considered to be negative while the samples captured at a second voltage level can be considered to be positive. Thereby, a combination of samples captured at different times, each sample being either positive or negative, can be combined to form the desired filtered sample value. The attribution of positive and negative sign to the respective samples can for example be implemented using a switch capacitor circuit where it can be selected which side, or pin, of the capacitor, i.e. "positive" or "negative", is connected to a common line for combining the samples.

According to one embodiment of the invention, the at least three sample and hold circuits may comprise capacitors of at least two different sizes, wherein a relative size of the capacitor is referred to as a weight. To allow for further options when forming the filter functionality, the different sample and hold circuits can be given individual weight, which in hardware can be embodied by capacitors of different relative size. E.g., the smallest capacitor can be given the weight "1", and a capacitor having twice the size is consequently given the weight "2".

According to one embodiment of the invention, the sampling control unit is configured to control said sample and hold circuits to sample such that a sum of weights for samples captured at the first voltage level is equal to a sum of weights for samples captured at the second voltage level. The purpose of this is that a reference level is "unknown", or may have a large variation due to noise. Accordingly, the change in output is measured after the signal has been applied. By doing this the dependence of the actual reference level is cancelled.

According to one embodiment of the invention, the ADC may advantageously be a differential ADC having a positive input and a negative input, and wherein at least one sample and hold circuit is connected to the positive input and at least one sample and hold circuit is connected to the negative input. When using a differential ADC, all the negative samples, e.g. samples taken with sample and hold circuits being connected to a negative reference voltage, can be connected to the negative input of the ADC. Correspondingly, the positive samples can be connected to the positive input, so that the ADC provides an output signal corresponding to the difference between the sum of positive samples and the sum of negative samples.

According to one embodiment of the invention, the ADC may be a single-ended ADC having a single input, wherein at least one sample and hold circuit is configured to provide a sample having a positive sign and at least one sample and hold circuit configured to provide a sample having a negative sign, and wherein a sum of all samples is provided to said single input. In other words, when using a single ended ADC the combination is performed analogously and the resulting sample value is provided to the input of the ADC to be converted. To achieve a subtraction function, as also described above, switches can be used allowing the capacitors to be turned around, i.e. allowing either side of the capacitor to be connected to the single input of the ADC based on a switch setting for the capacitor. Thereby, the sign of the sample can be selected by means of the capacitor switch setting such that a subtraction can take place on the input line to the ADC.

According to one embodiment of the invention, the drive control circuitry may be configured to provide a drive signal comprising at least one square pulse, a square wave, at least one sinc pulse or a sine wave. The time-varying drive signal may, for instance, be provided as a pulse train having a pulse repetition frequency or a combination of pulse repetition frequencies. The pulses in such a pulse train may, for example, be square wave pulses or individual sinc pulses. A square pulse can be considered to have two distinct voltage levels, corresponding to the first voltage level $V_1$ and the second voltage level $V_2$. For a sine wave or sinc pulse, the first voltage level $V_1$ and the second voltage level $V_2$ are selected as separate distinguishable voltage levels of the wave or pulse. Moreover, the drive signal need not be the same for consecutive AD-conversion sequences.

According to one embodiment of the invention, the drive control circuitry may be configured to provide a drive signal in the form of a pulse train having a frequency being a multiple or division of a frequency of a known noise component. By adjusting the drive signal to provide a pulse train, such as a square wave, having a frequency being a multiple of a known frequency of a noise component, the noise can be more effectively suppressed. By multiple or division it should be understood that the frequency of the known noise component is multiplied or divided by an integer.

According to one embodiment of the invention, the drive control circuitry is configured to provide a drive signal in the form of a pulse train being out of phase of a noise component having a known frequency. If the drive signal comprises a pulse train such as a square wave or a sine wave having a frequency similar to the frequency of the noise, it may be form a filter which effectively suppresses the noise. Accordingly, it is desirable to provide a drive signal comprising a pulse train which is out of phase with the noise. This can for example be achieved by gradually changing, or shifting, the phase of the pulse train for consecutive AD-conversions to determine for which phase noise suppression is most effective.

According to one embodiment of the invention, the sensing circuitry may comprise a charge amplifier comprising a negative input, a positive input, an output providing the analog sensing signal, a feedback capacitor, a reset switch in parallel with the feedback capacitor, and an amplifier.

According to one embodiment of the invention, the drive signal circuitry may comprise a controllable voltage source connected to a conductive structure located in the vicinity of the fingerprint sensor to inject a drive signal into a finger placed on the fingerprint sensor and on the conductive structure for providing the change in potential difference between the finger and the sensing structure. The conductive structure can for example be a conductive frame arranged around the fingerprint sensor, and such a frame may also be referred to a bezel.

Moreover, the change in potential difference between the finger and the sensing structure may also be achieved by connecting a controllable voltage source to the positive input of the charge amplifier. Furthermore, the change in potential difference can also be achieved by connecting a controllable voltage source to a common ground plane of the fingerprint sensor.

According to one embodiment of the invention, the difference between the first voltage level $V_1$ and the second voltage level $V_2$ of the drive signal is preferably at least 0.1V. The main requirement of the difference between the $V_1$ and $V_2$ of the drive signal is that the difference should provide a measurable difference in the output signal from the charge amplifier.

According to a second aspect of the invention, there is provided a method for noise reduction in a capacitive fingerprint sensing device comprising a plurality of sensing elements, the fingerprint sensing device comprising sensing circuitry for providing an analog sensing signal indicative of a distance between a finger and a sensing structure of the sensing element and drive signal circuitry for providing a change in potential difference between the finger and the sensing structure, the method comprising: providing a drive signal comprising at least one drive pulse having a maximum voltage level and a minimum voltage level for providing the change in potential difference; capturing at least three samples of the sensing signal, wherein the at least three samples comprises at least one sample captured when the drive signal is at a first voltage level $V_1$ and at least one sample captured when the drive signal is at a second voltage level $V_2$, different from $V_1$; forming a sum of the at least three samples, wherein the samples are selected in time such that a noise component is suppressed from the sensing signal when the sum is formed; and forming a digital signal from the sum of the at least there samples.

To form a sum of samples should in the present context be interpreted to mean that the at least three samples are added together, and where one ore more of the samples may have a negative sign.

According to one embodiment of the invention, the method further comprises giving each sample a weight depending on the relative amplitude of the noise signal at the sampling time for the respective sample, wherein the weights are selected so that a sum of weights for samples captured at the first voltage level of the drive signal is equal to a sum of weights for samples captured at the second voltage level of the drive signal.

Effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the system and method according to the present invention are mainly described with reference to a fingerprint sensing device comprising a plurality of analog sample and hold circuits in the form of a capacitor and a switch for controlling the capacitor. Even though the following description is based on passive sample and hold circuits, e.g. switched capacitors, it is equally possible to implement various embodiments of the invention using active sampling circuitry. Active sampling circuitry may for example comprise amplifiers with capacitors in the feedback path, or buffers.

Figure 1:
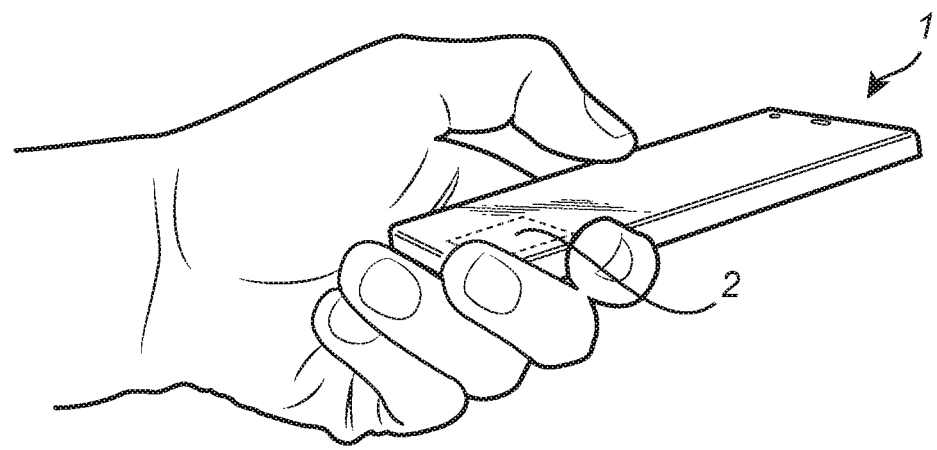
FIG. 1 schematically illustrates a mobile phone comprising a fingerprint sensing device.

FIG. 1 schematically illustrates an application for a fingerprint sensing device 2 according to an example embodiment of the present invention, in the form of a mobile phone 1 with an integrated fingerprint sensing device 2. The fingerprint sensing device 2 may, for example, be used for unlocking the mobile phone 1 and/or for authorizing transactions carried out using the mobile phone, etc. A fingerprint sensing device according to various embodiments of the invention may also be used in other devices, such as tablet computers, laptops, smartcards or other types of consumer electronics.

Figure 2:
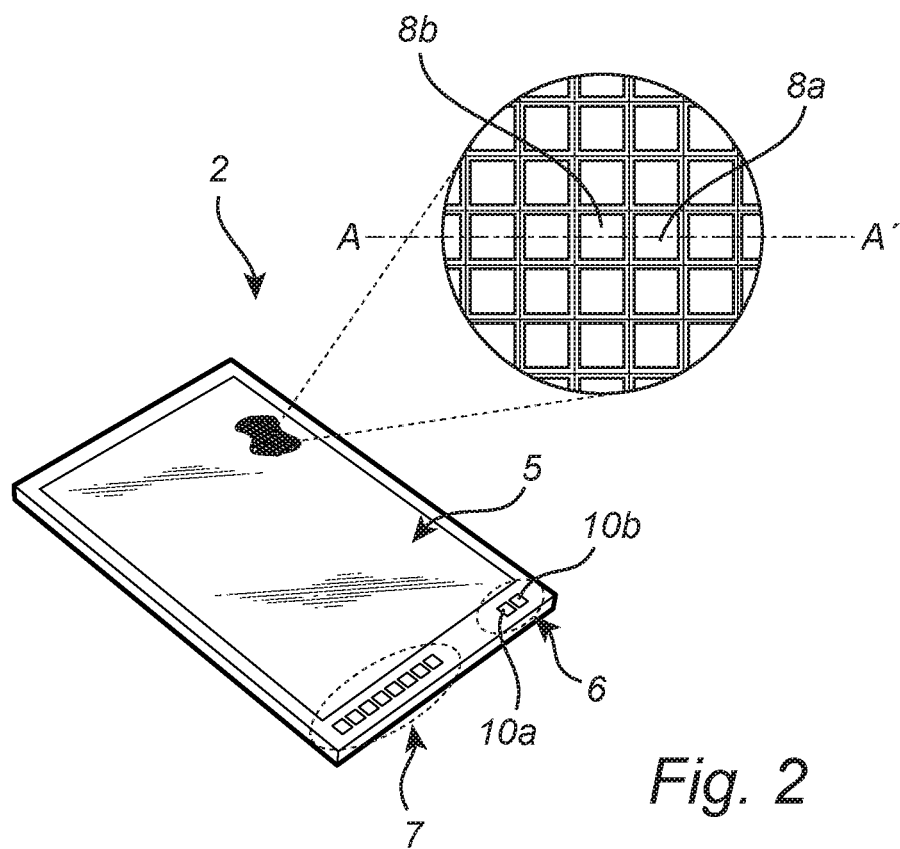
FIG. 2 schematically shows the fingerprint sensing device in FIG. 1.

FIG. 2 schematically shows the fingerprint sensing device 2 comprised in the mobile phone 1 in FIG. 1. As can be seen in FIG. 2, the fingerprint sensing device 2 comprises a sensor array 5, a power supply interface 6 and a communication interface 7. The sensor array 5 comprises a large number of sensing elements 8a-b (only two of the sensing elements have been indicated with a reference numeral to avoid cluttering the drawing), each being controllable to sense a distance between a sensing structure comprised in the sensing element 8a-b and the surface of a finger contacting the top surface of the sensor array 5.

The power supply interface 6 comprises first 10a and second 10b contact pads, here shown as bond pads, for connection of a supply voltage $V_{supply}$ to the fingerprint sensing device 2.

The communication interface 7 comprises a number of bond pads for allowing control of the fingerprint sensing device 2 and for acquisition of fingerprint data from the fingerprint sensing device 2.

Figure 3:
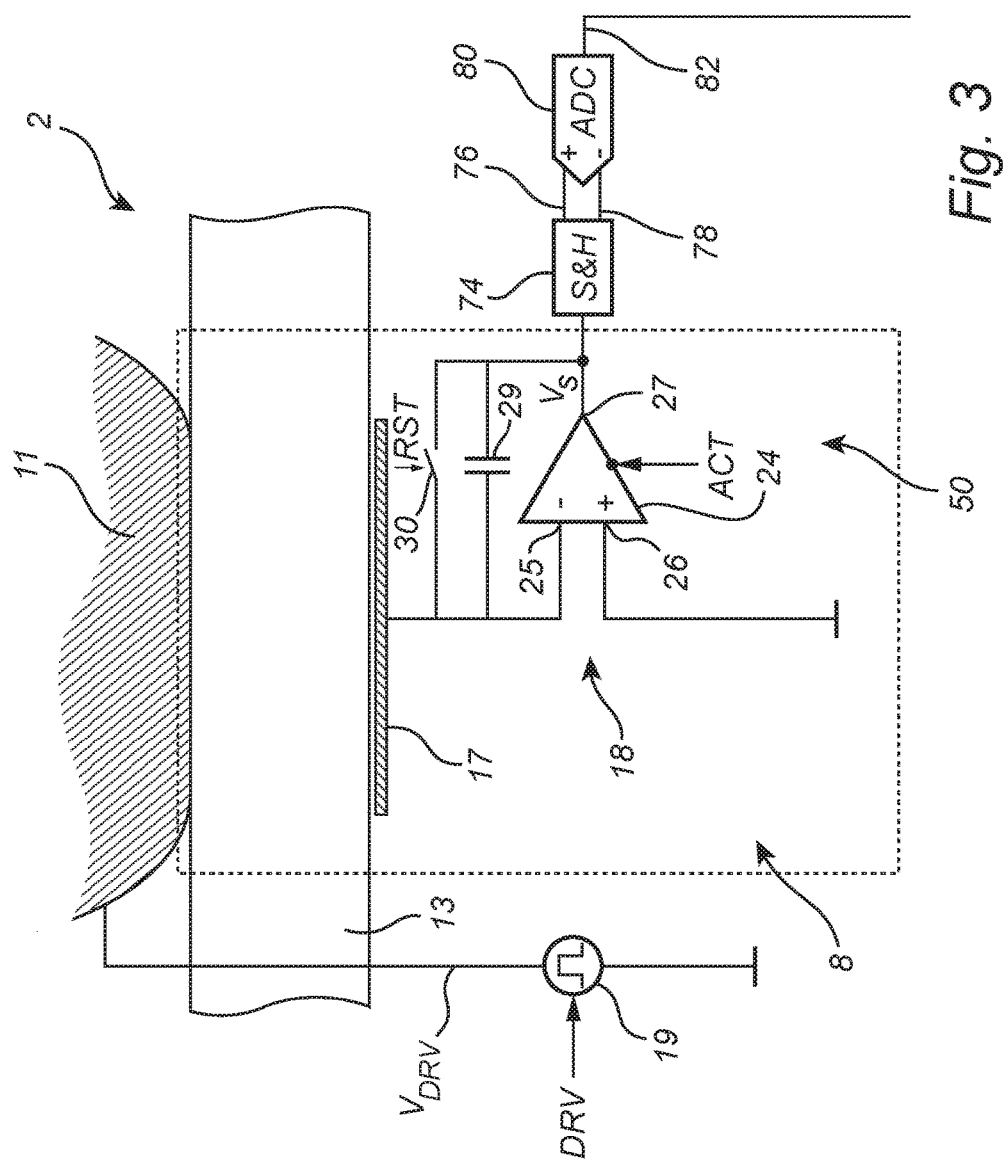
FIG. 3 is a schematic circuit diagram of a part of the fingerprint sensing device, including the sensing circuitry and the sampling circuitry according to an embodiment of the invention.

FIG. 3 is a schematic cross section and a circuit schematic of a portion of a fingerprint sensing device 2 according to an embodiment of the invention, taken along the line A-A' as indicated in FIG. 2 with a finger 11 placed on top of the sensor array 5. The fingerprint sensing device comprises a plurality of sensing elements 8, each comprising a protective dielectric top layer 13, a conductive sensing structure 17, here in the form of a metal plate 17 underneath the protective dielectric top layer 13, a charge amplifier 18, and drive signal providing circuitry 19 for providing a drive signal $V_{DRV}$ to the finger as is schematically indicated in FIG. 3. As illustrated in FIG. 3, a ridge of the finger 11 is located directly above the sensing structure 17 indicating the minimum distance between the finger 11 and the sensing structure 17, defined by the dielectric top layer 13.

The charge amplifier 18 comprises at least one amplifier stage, here schematically illustrated as an operational amplifier (op amp) 24 having a first input (negative input) 25 connected to the sensing structure 17, a second input (positive input) 26 connected to ground or to another reference potential, and an output 27. In addition, the charge amplifier 18 comprises a feedback capacitor 29 connected between the first input 25 and the output 27, and reset circuitry, here functionally illustrated as a switch 30, for allowing controllable discharge of the feedback capacitor 29. The charge amplifier 18 may be reset by operating the reset circuitry 30 to discharge the feedback capacitor 29.

As is often the case for an op amp 24 in a negative feedback configuration, the voltage at the first input 25 follows the voltage at the second input 26. Depending on the particular amplifier configuration, the potential at the first input 25 may be substantially the same as the potential at the second input 26, or there may be a substantially fixed offset between the potential at the first input 25 and the potential at the second input 26. In the configuration of FIG. 3, the first input 25 of the charge amplifier is virtually grounded.

When a time-varying potential is provided to the finger 11 by the drive signal providing circuitry 19, a corresponding time-varying potential difference occurs between the sensing structure 17 and the finger 11. The induced change in potential difference between the finger 11 and the reference structure 17 in turn results in a sensing voltage signal $V_s$ on the output 27 of the charge amplifier 18.

Analog sampling circuitry 74 is connected to the output 27 of the charge amplifier 18 to receive and to sample the sensing signal $V_s$. The sampling circuitry 74 may comprise, or be connected to, a control unit which controls the individual sample and hold (S&H) circuits comprised in the sampling circuitry 74 to sample the sensing signal $V_s$ at the desired points in time with reference to the timing of a drive signal. The sampling circuitry will be discussed in further detail in the following.

The analog sampling circuitry 74 comprises two outputs, here referred to as a positive output 76 and a negative output 78, which are connected to a differential analog-to-digital converter (ADC) 80 which is configured to convert the difference between the positive output 76 and the negative output 78 into a digital sensing signal 82 indicative of the capacitive coupling, and thereby of the distance, between the sensing structure 17 and the finger 11. Alternatively, the analog sampling circuitry may comprise a single output connected to a single-ended ADC (not shown), in which case the samples are combined in the sampling circuitry prior to the ADC, and where the resulting difference signal is AD-converted. In the present example, the sensing circuitry for a sensing element 17, i.e. for a pixel, is illustrated to comprise one sample-and-hold circuitry module 74 and one ADC 80. However, it is also possible to share the sample-and-hold circuitry 74 and the ADC 80 between many different pixels by using multiplexers to connect a plurality of pixels to each one sample-and-hold circuitry module 74. Accordingly, the output 27 of the charge amplifier 18, and/or the output sample-and-hold circuitry 74 may be connected to a multiplexer. For example, one sample-and-hold circuitry module 74 can be shared by one column of pixels.

Figure 4:
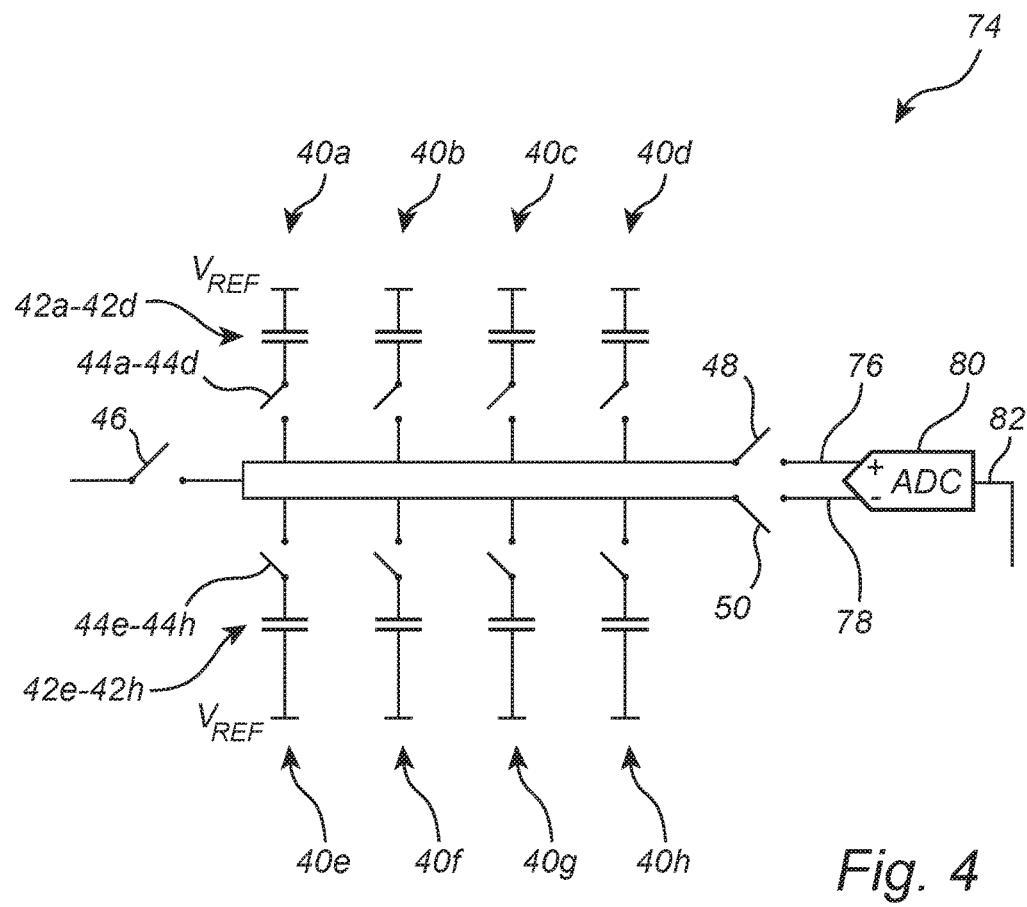
FIG. 4 is a schematic circuit diagram of sampling circuitry according to an embodiment of the invention.

FIG. 4 outlines a sampling circuit 74 according to an example embodiment of the invention. The sampling circuit illustrated herein comprises eight sample-and-hold circuits 40a-h. Each sample-and-hold circuit comprises a capacitor 42a-h on one side connected, via a switch 44a-h, to the sensing signal Vs, and on the other side to an output out of the sampling circuit 74. In the present example, the sample-and-hold circuits 40a-d are connected to a positive input 76 of the ADC 80 via a first switch 48, and the sample-and-hold circuits 40e-h are connected to a negative input 76 of the ADC 80 via a second switch 50. Moreover, each capacitor 42a-h is connected to a reference voltage $V_{REF}$, for example $V_{DD}$. In the present example using a differential ADC 80, the sign of the negative input and the positive input is defined by the ADC. The sample-and-hold circuits 40a-d are connected to the positive input 76 of the ADC and the samples obtained by the sample-and-hold circuits 40a-d are referred to as positive samples. Correspondingly, the samples obtained by the sample-and-hold circuits 40e-h connected to the negative input of the ADC 80 are referred to as negative samples. The switches 44a-h control the actual sampling such that when a switch is opened, the resulting voltage over the corresponding capacitor is captured. If a single ended ADC is used, circuits 40a-d may be connected directly to the single input line as positive samples and circuits 40e-h may be turned around such that a negative voltage is provided to the single input line such that a resulting difference voltage can be provided directly to the input of the single ended ADC.

During an analog sampling sequence, the switch 46 is closed so that the output signal VS is provided to the sampling circuitry. The switches 48 and 50 are open so that the ADC 80 is disconnected. Switches 44a-d are closed so that the capacitor charge is proportional to $V_S$. When a sample is to be captured, one or more of the switches 44a-h opens so that a sample is stored in the capacitor. Once the analog sampling sequence is completed and all the required samples are captured, the switch 46 opens and the switches 48 and 50 close. Next, the switches 44a-h closes so that the samples stored in the capacitors can be provided to the inputs 76, 78 of the ADC 80, thereby enabling the AD-conversion of the difference between the positive and negative input.

Even though the above sampling circuitry 74 is illustrated to comprise eight individual sample-and-hold circuits 40a-h, noise suppression can be achieved using any number of sample-and-hold circuits higher than 2 as will be illustrated in the following.

The sampling, i.e. the switches 44a-h, is controlled by a control unit (not shown) which also controls the drive signal $V_{DRV}$. Thereby, the timing of the sampling can be controlled based on the characteristics of the drive signal. Moreover, it is not required to use all of the sample-and-hold circuits 40a-h in an analog sampling sequence. Instead, only the sample-and-hold circuits required for achieving the desired filter functionality can be used which provides a high degree of flexibility in the analog sampling sequence and which allows for fast sampling in the absence of noise. The analog sampling sequence can be defined as the sequence where the analog output signal $V_S$ is sampled between consecutive AD-conversions.

Figure 5:
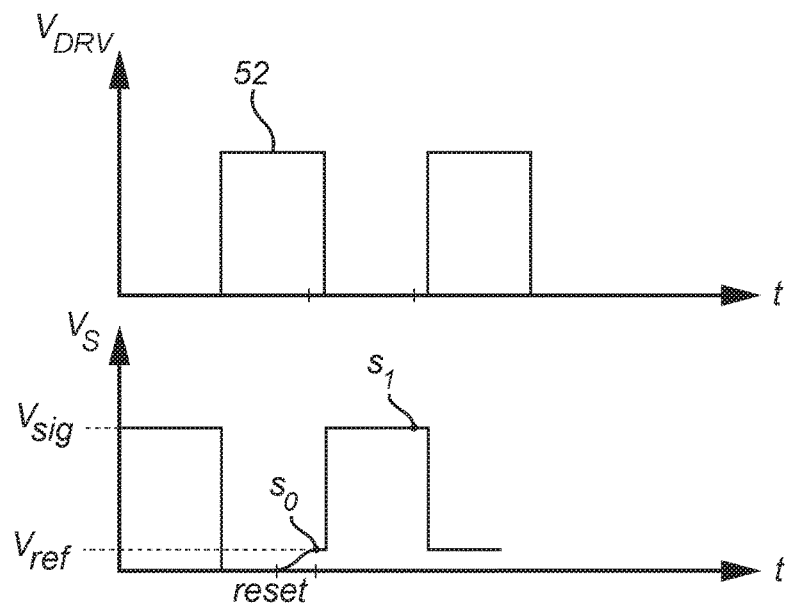
FIG. 5 schematically illustrates a prior art sampling method.

FIG. 5 (prior art) illustrates the drive signal $V_{DRV}$ and the sensing signal $V_S$ for the case when the drive signal $V_{DRV}$ comprises a plurality of square pulses, and where analog sampling is performed during one period of the drive signal. The drive signal $V_{DRV}$ is injected into the finger, and when the drive pulse 52 is positive, the reset switch 30 of the charge amplifier 18 is closed. When the system is stabilized the switch 30 is opened again and the output signal rises slightly to represent a reference level, $V_{REF}$. After that, the drive signal drops, causing a change in charge between the finger 11 and the sensing plate 17, and the output single Vs rises to a value proportional to the distance between the finger 11 and the sensing plate 17, referred to as a signal level, $V_{SIG}$.

For conventional correlated double sampling illustrated in FIG. 5, a first sample $S_0$ is captured when the output signal is low and a second sample $S_1$ is captured when the output signal is high, where the resulting output signal $S_1$-$S_0$ eliminates the effect of any voltage offset after the reset of the charge amplifier to more accurately represent the distance between the finger 11 and the sensing plate 17.

In the following, various embodiments of the invention will be discussed with reference to the functionality of different filters achieved by employing different sampling schemes and drive signals using the above described analog sampling circuitry 74.

Figure 6A:
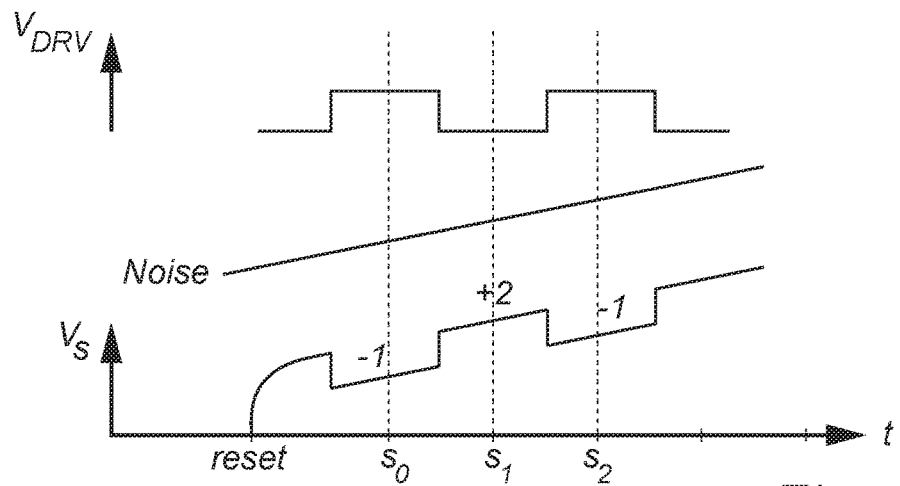
FIGS. 6a-d schematically illustrate methods according to embodiments of the invention.

FIG. 6a illustrates an example where the sensing signal $V_S$ contains a noise component which has a low frequency in relation to the frequency of the drive signal $V_{DRV}$. Such low frequency noise can for example be introduced into the device 1 via a charger as 50/60 Hz noise. Here, the low frequency noise can be considered to be approximately constant in comparison to the drive signal frequency which may be in the kHz range. In the present illustrations, the amplitude of the noise component may be exaggerated to more clearly illustrate the effect of noise.

The analog sampling sequence illustrated in FIG. 6 can be considered to start with a reset signal activating the switch 30 to reset the charge amplifier 18. Next, a first sample $S_0$ is captured. The sample $S_0$ is here illustrated as having the weight −1, where the minus sign indicates that the sample is captured at a time when the output signal $V_S$ is at the low level, which is when the drive signal is high, and that the sample is captured with one of the sample-and-hold circuits 40e-h connected to the negative input of the ADC 80. The low level of the output signal Vs can be referred to as the reference level. The high and low voltage levels of the drive signal can be seen as the first voltage level $V_1$ and the second voltage level $V_2$, respectively.

When $V_{DRV}$ goes low, $V_S$ goes high, and a second sample $S_1$, here given the weight +2, is captured representing the signal level $V_{SIG}$. A sample can for example be considered to have the weight +2 if it is being captured by a sample-and-hold circuit comprising a capacitor being twice the size of a capacitor in the sample-and-hold circuit capturing the first sample $S_0$. Alternatively, the sampling circuitry may comprise sample-and-hold circuits where all sampling capacitors are of the same size, as illustrated in FIG. 4. In that case, a sample may be attributed a specific weight by using two or more sample-and-hold circuits simultaneously, where the weight of the sample can be considered to be equal to the number of sample-and-hold circuits used. Accordingly, a sample is in practice defined by specific point in time when the sample is captured, and not by the specific sample-and-hold circuit used to capture the sample, since the sample-and-hold circuits can be controlled arbitrarily to capture a sample at any time during the analog sampling sequence. Thereby, in sample and hold circuitry where all sample-and-hold circuits are of equal size, the maximum weight of a sample is equal to the number of sample-of hold circuits connected to an input of the ADC 80.

Furthermore, the samples are herein illustrated as being captured instantaneously at a specific point in time. However, it is equally possible that each sample corresponds to an integration over a certain finite time period.

Finally, a third sample $S_2$ is captured when $V_{DRV}$ again is low and, and $V_S$ is at a level corresponding to the reference level plus the induced noise signal.

The following summation of the samples, $S_0+S_1+S_2$ can be divided such that first the sum of negative samples $S_0+S_2$ is subtracted from the sum of the positive samples, here only $S_1$, giving the resulting output signal as $S_1-(S_0+S_2)$. The summation of the samples can also be seen as $2V_{SIG}-(V_{REF}+V_{REF})=V_{SIG}-V_{REF}$ such that the resulting output is the difference between the signal level and the reference level without the influence of noise. This is the resulting signal that is AD-converted by the ADC 80 to be used when producing a fingerprint image.

In particular, a key to the filtering of the output signal is that the weight of the positive samples is equal to the weight of the negative samples such that the noise contribution can be cancelled. This requires that the total noise contribution is equal in the samples at the reference level as in the samples at the signal level. In the example illustrated in FIG. 6a, the slope of the noise is considered to be constant and the time between samples is also constant, leading to the same total noise contribution in both positive and negative samples. In general, for noise having a constant slope, a filtering functionality can easily be achieved by having a constant time between samples, even though alternative sampling scenarios are also possible.

Accordingly, analog filtering can be performed in real-time prior to AD-conversion by controlling the drive pulse and the analog sampling circuitry. An analog sampling sequence can be predefined in the form of drive signal and sampling instructions in a registry connected to a central control unit, such as a microprocessor. Moreover, the proposed sampling scheme provides a high degree of flexibility in forming different types of analog filters, for handling different types of noise, by controlling the drive signal and the sampling times and weights.

The analog sampling sequence is followed by an analog-to-digital conversion sequence where the pixel values from the sensing elements in the sensing array are read by connected readout circuitry to form a fingerprint image.

Furthermore, using the above described analog filtering, the time between adjacent samples can be shorter than what is possible to achieve if each sample was to be AD-converted individually for use in subsequent digital filtering.

Moreover, the sampling described above describes a second order filter. It is easy to see that higher order filters providing a sharper frequency response can be formed by increasing the number of samples while adhering to the above descried principles. Further filter examples will also be described in the following.

Figure 6B:
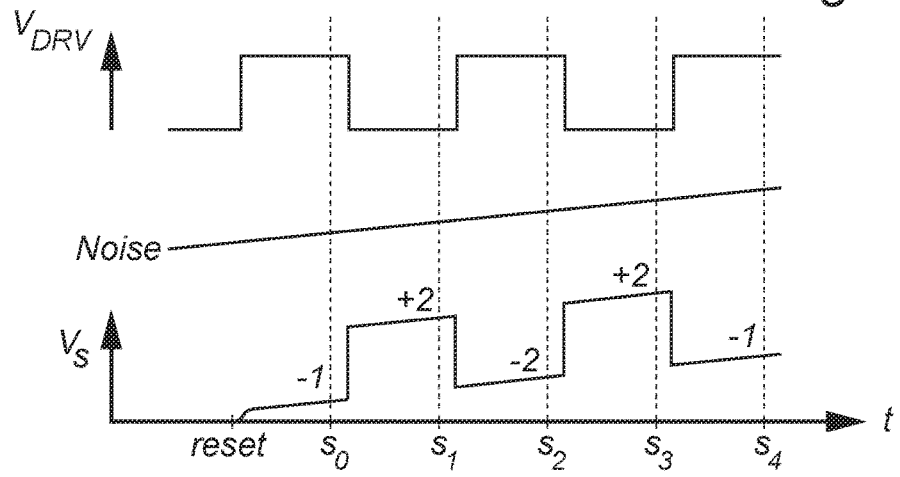

An example of a higher order filter is illustrated in FIG. 6b, where three samples are captured at the reference level, $S_0$, $S_2$ and $S_4$, and two samples are captured at the signal level, $S_1$, and $S_3$. The samples $S_1$ and $S_3$ have the weight +2 and the sample $S_2$ has the weight −2. Also here, the time between samples is constant. The resulting signal after combining the samples becomes $(S_1+S_3)-(S_0+S_2+S_4)=(2+2)V_{SIG}-(1+2+1)V_{REF}=4V_{SIG}-4V_{REF}$. Here, the difference between $V_{SIG}$ and $V_{REF}$ is multiplied by four. This will be accounted for in the resulting AD-converted since the readout system as a whole takes the sampling scheme into account and thus knows if the resulting digital signal represents a multiple of $V_{SIG}-V_{REF}$.

Figure 6C:
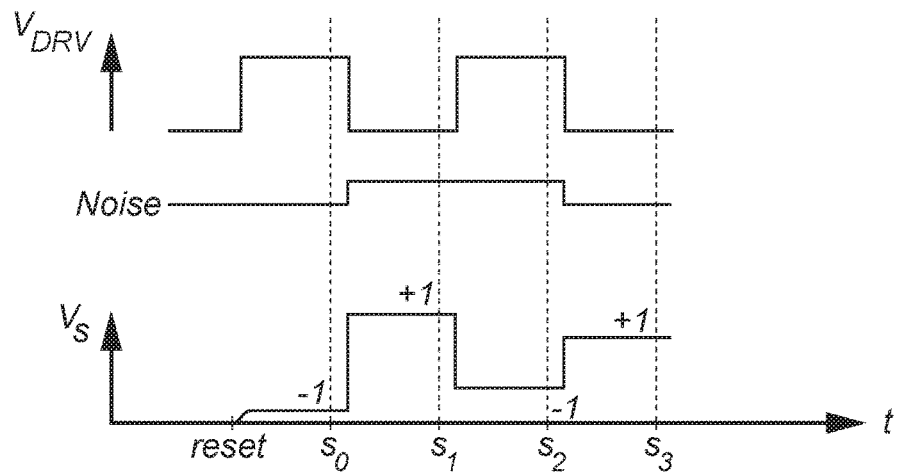

FIG. 6c illustrates an example where noise in the form of a high frequency square pulse is present in the sensing signal. High frequency square noise can for example be introduced as switching noise from a switched power supply, or from other components in the device such as a display or touch-screen operating at high frequencies. In general, high frequency noise can be considered to comprise noise which cannot be considered to be constant during an analog sampling sequence.

In FIG. 6c, samples $S_1$ and $S_2$ are captured when the output signal $V_S$ is influenced by the noise signal, and samples $S_0$ and $S_3$ are captured when the output signal $V_S$ is not influenced by the noise signal.

In the case of square noise, or for similar types of noise where the noise level changes abruptly, it is also required that the samples captured when $V_S$ is influenced by noise is equal to the weight of samples when $V_S$ is not influenced by noise.

Figure 6D:
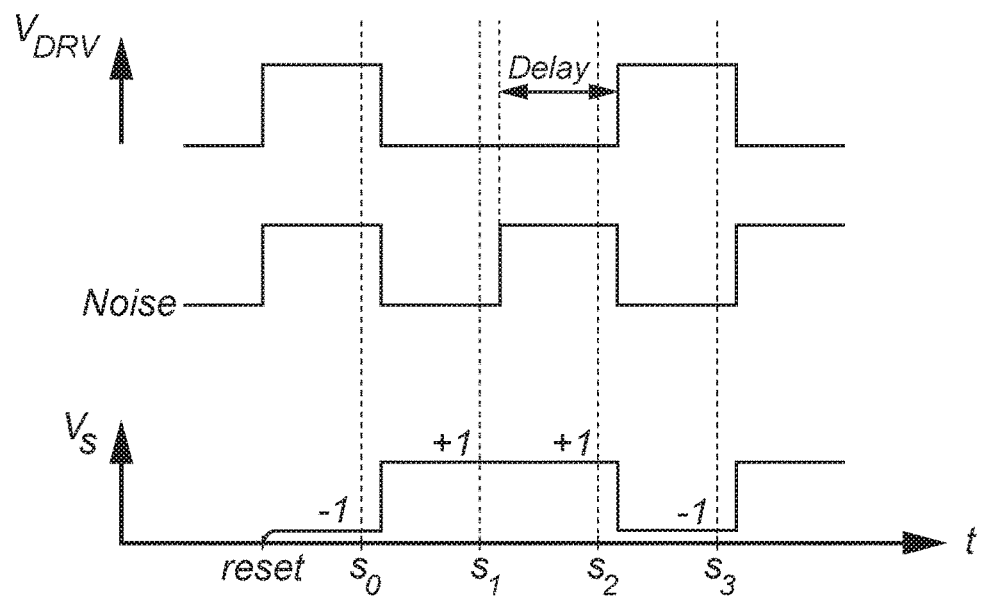

FIG. 6d illustrates a situation when the drive signal is phase shifted, or delayed, by half a period between two consecutive drive pulses. If noise has properties similar or equal to the drive signal, it may be difficult or impossible to sample the output signal in a way so that noise is cancelled. If it is observed that the noise is of a similar frequency as the drive signal, the drive signal can be formed as a sequence of two pulses where a second pulse is phase shifted, i.e. delayed, by half a period with respect to the first pulse, thereby enabling noise cancelling in the same manner as described above as illustrated by samples $S_0$-$S_4$. Accordingly, the duty cycle of the drive pulse can be varied to facilitate noise suppression for various types of noise. Moreover, the drive signal may comprise a series of individual pulses, where the shape of pulses and the time between consecutive pulses can be selected arbitrarily. In such an implementation, the concept of drive signal frequency, period and duty cycle may not be applicable.

Figure 7A:
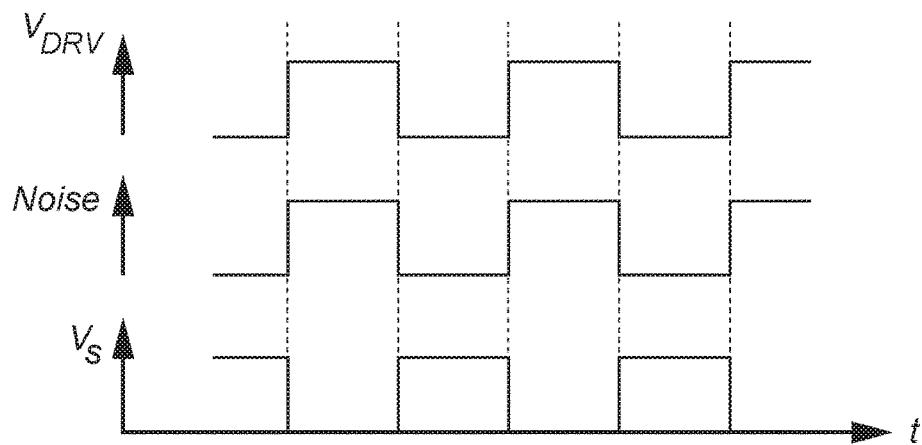
FIGS. 7a-c schematically illustrate methods according to embodiments of the invention.
Figure 7B:
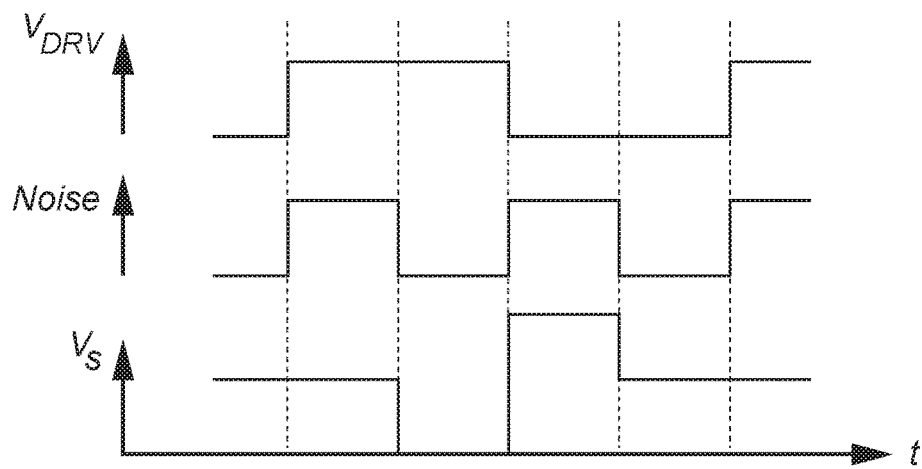
Figure 7C:
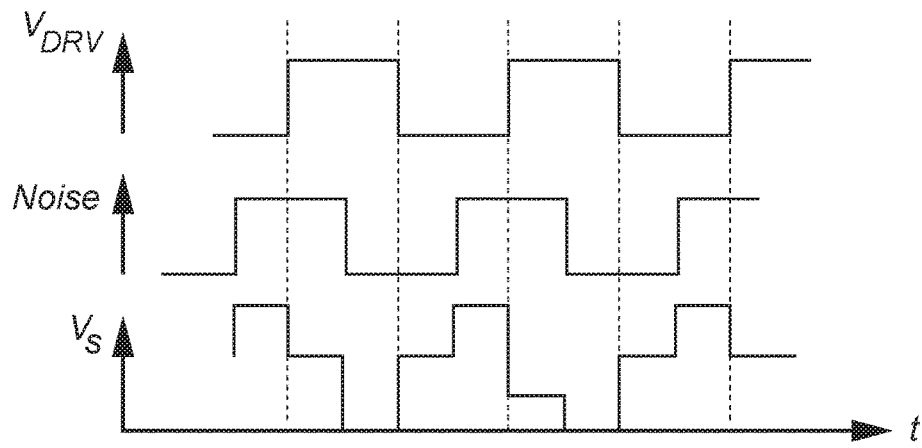

FIGS. 7a-c schematically illustrates further examples of how the drive signal can be adapted to handle high frequency noise having the same or similar frequency to a drive signal in the form of a square wave. In FIG. 7a, the noise has the same frequency as the drive signal, and is also in phase with the drive signal, meaning that filtering according to the above descried method is not possible. In particular, in the situation illustrated in FIG. 7a it is not possible to acquire samples where the noise contribution to the signal level of $V_S$ is equal to the noise contribution to the reference level of $V_S$.

In FIG. 7b, the drive signal has a frequency which is twice that of the noise, thereby enabling filtering of the noise since samples can be acquired at for all combinations of high and low level of the drive signal and at high and low levels of the noise contribution. Accordingly, by altering the frequency of the drive signal, either by increasing or decreasing, filtering of the illustrated noise is enabled. The frequency of the drive signal illustrated in FIG. 7a can for example be multiplied or divided by an integer.

FIG. 7c illustrated an example where the drive signal is phase shifted with respect to the drive signal of FIG. 7a. Also here it is possible to sample to construct a filter. If it is known or suspected that the noise frequency coincides with the drive signal frequency, the drive signal can for example be phase shifted by a quarter of a period, or it can be incrementally phase shifted in small steps until the observed noise is at a minimum. Thereby, the filter can learn to suppress different types of noise. Accordingly, it is also possible to store specific sampling profiles for different noise conditions, for example if a specific charger is used or if certain features of the device are being used which care known to give rise to a specific type of noise.

Furthermore, a drive signal may also comprise a pulse train where the individual pulses are different, i.e. having different respective pulse lengths, thereby avoiding the scenario where the frequency of the drive signal and the frequency of the noise coincides.

Figure 8A:
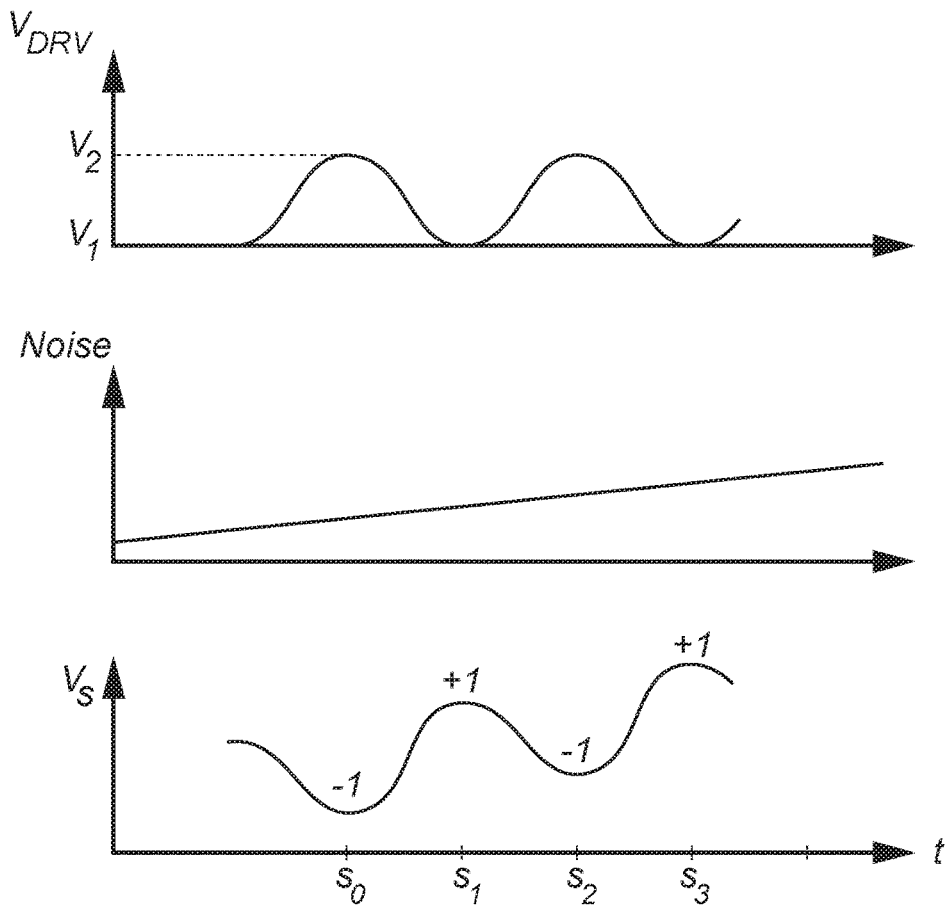
FIGS. 8a-b schematically illustrate methods according to embodiments of the invention.

FIG. 8a illustrates an example where the drive signal comprises a sine wave and where the noise is approximately constant in relation to the drive signal. The sine wave can in practice be replaced by sinc pulses to the same effect.

Figure 8B:
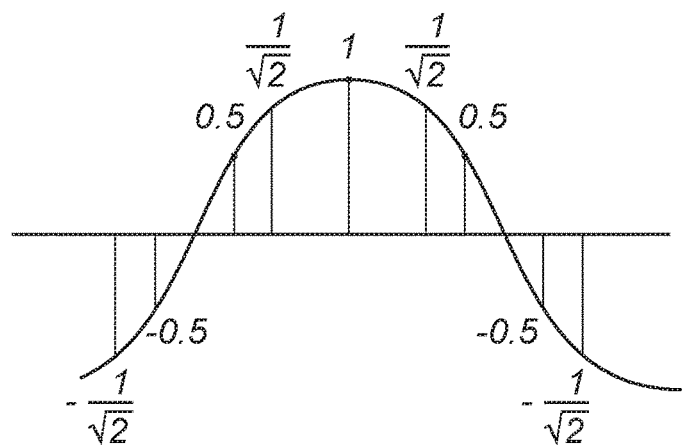

FIG. 8b illustrates an example where the coefficients of the sampling capacitors are configured to be aligned with the shape, i.e. amplitude, of the drive signal, here a sine wave. By adapting the sampling coefficients to the amplitude of the drive signal, and by capturing multiple samples during one period of the drive signal, a filter with high frequency selectivity can be achieved. The different coefficients could be achieved by any of the methods described above, e.g. by combining a number of capacitors for each sample resulting in the desired coefficient, or by using capacitors of varying sizes.

It is not required that the samples are captured at the respective maximum and minimum amplitude of the sine wave. However, for the filtering to function properly, it is required that all samples referred to as negative are captured when the drive signal is at the same relative voltage level $V_1$ and that all samples referred to as positive are captured at the same relative voltage level $V_2$ of the drive signal, different from $V_1$.

Figure 9:
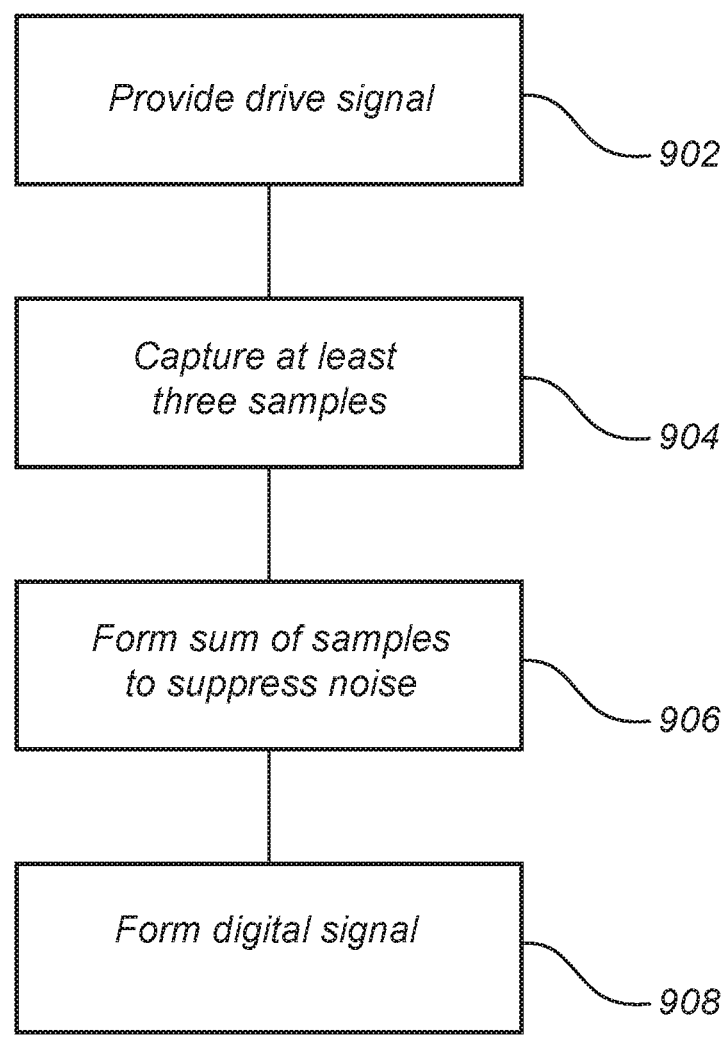
FIG. 9 is a flow chart outlining the general steps of a method according to an embodiment of the invention.

FIG. 9 is a flow chart outlining the general method steps of the above discussed method for noise reduction. The method involves the steps of providing 902 a drive signal, capturing 904 at least three samples, forming 906 a sum of samples such that noise in the signal is suppressed, and forming 908 a digital signal.

The features of the method are analogous to those discussed above in relation to the sampling of the signal in the fingerprint sensing device. As can be understood from the above description, an endless number of different filters can be formed using the described methodology, where the key to the key feature enabling the filter functionality is the real-time analog sampling and concurrent control of the drive signal.

As can be understood from the above examples, there are many different ways to tune the drive signal to suppress different types of noise. If the noise properties are completely unknown, it is possible to employ a number of preset analog sampling sequences and to evaluate the resulting filtered signals to determine which of the sampling sequences produce the output signal having the lowest noise content. Thereby, noise can be suppressed even if the noise properties are unknown. If the noise properties are unknown, a self learning algorithm may also be employed to form an adaptive filter where the sampling is adapted based on feedback from the readout circuitry.

In many cases, some properties of the noise are known so that an analog sampling sequence can be preset to suppress specific noise. Noise having known properties can for example originate from a device charger having a known switching frequency or from other components in the device such as a display or touch screen.

It is also possible to determine the noise properties in the device and to configure the analog sampling sequence to suppress the determined noise.

Even though the invention has been described with reference to specific exemplifying embodiments thereof, many different alterations, modifications and the like will become apparent for those skilled in the art. Also, it should be noted that parts of the sensing device may be omitted, interchanged or arranged in various ways, the sensing device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A capacitive fingerprint sensing device for sensing a fingerprint pattern of a finger, said capacitive fingerprint sensor comprising a plurality of sensing elements, each sensing element comprising:
   a protective dielectric top layer to be touched by said finger;
   an electrically conductive sensing structure arranged underneath said top layer;
   sensing circuitry for providing an analog sensing signal indicative of a distance between said finger and said sensing structure, said fingerprint sensing device further comprising:
   drive signal circuitry configured to provide a drive signal comprising at least one drive pulse having a maximum voltage level and a minimum voltage level for providing a change in potential difference between said finger and said sensing structure;
   analog sampling circuitry comprising at least three analog sample and hold circuits arranged to sample said sensing signal, and a sampling control unit for individually controlling each of said at least three analog sample and hold circuits to capture a sample at a specified time, thereby forming at least three samples, wherein said at least three samples comprises at least one sample captured when said drive signal is at a first voltage level $V_1$ and at least one sample captured when said drive signal is at a second voltage level $V_2$, different from $V_1$; and
   an analog-to-digital converter, ADC, connected to said analog sampling circuitry and configured to convert a combination of said at least three samples into a digital sensing signal indicative of a capacitive coupling between said sensing structure and said finger, wherein said at least three samples are captured at said specified times such that a noise component is suppressed from said sensing signal when said combination is formed.

2. The fingerprint sensing device according to claim 1, wherein said analog sampling circuitry is configured to sample said sensing signal at selected points in time based on a known property of a noise component such that said noise component is suppressed.

3. The fingerprint sensing device according to claim 1, wherein each sample and hold circuit comprises a capacitor and a switch controlling said capacitor.

4. The fingerprint sensing device according to claim 3, wherein said analog sampling circuitry comprises an even number of sample and hold circuits, each sample and hold circuit comprising a capacitor and a switch controlling said capacitor, wherein all capacitors have the same size.

5. The fingerprint sensing device according to claim 4, wherein said sampling control unit is configured to control said sample and hold circuits to sample such that an equal number of samples are captured at said first voltage level and at said second voltage level of said drive signal.

6. The fingerprint sensing device according to claim 3, wherein said at least three sample and hold circuits comprises capacitors of at least two different sizes, wherein a relative size of said capacitor is referred to as a weight.

7. The fingerprint sensing device according to claim 6, wherein said sampling control unit is configured to control said sample and hold circuits such that a sum of weights for samples captured at said first voltage level is equal to a sum of weights for samples captured at said second voltage level.

8. The fingerprint sensing device according to claim 1, wherein said ADC is a differential ADC having a positive input and a negative input, and wherein at least one sample and hold circuit is connected to said positive input and at least one sample and hold circuit is connected to said negative input.

9. The fingerprint sensing device according to claim 1, wherein said ADC is a single-ended ADC having a single input, wherein at least one sample and hold circuit is configured to provide a sample having a positive sign and at least one sample and hold circuit configured to provide a sample having a negative sign, and wherein a sum of all samples is provided to said single input.

10. The fingerprint sensing device according to claim 1, wherein said drive control circuitry is configured to provide a drive signal comprising at least one square pulse, a square wave, at least one sinc pulse or a sine wave.

11. The fingerprint sensing device according to claim 1, wherein said drive control circuitry is configured to provide a drive signal in the form of a pulse train having a frequency being a multiple or division of a frequency of a known noise component.

12. The fingerprint sensing device according to claim 1, wherein said drive control circuitry is configured to provide a drive signal in the form of a pulse train being out of phase with a noise component having a known frequency.

13. The fingerprint sensing device according to claim 1, wherein said sensing circuitry comprises a charge amplifier comprising a negative input, a positive input, an output providing said analog sensing signal, a feedback capacitor, a reset switch in parallel with the feedback capacitor, and an amplifier.

14. The fingerprint sensing device according to claim 1, wherein said drive signal circuitry comprises a controllable voltage source connected to a conductive structure located in the vicinity of said fingerprint sensor to inject a drive signal into a finger placed on said fingerprint sensor and on said conductive structure for providing said change in potential difference between said finger and said sensing structure.

15. The fingerprint sensing device according to claim 1, wherein said difference between the first voltage level $V_1$ and the second voltage level $V_2$ of the drive signal is at least 0.1V.

16. A method for noise reduction in a capacitive fingerprint sensing device comprising a plurality of sensing elements, said fingerprint sensing device comprising sensing circuitry for providing an analog sensing signal indicative of a distance between a finger and a sensing structure of said sensing element and drive signal circuitry for providing a change in potential difference between said finger and said sensing structure, said method comprising:
   providing a drive signal comprising at least one drive pulse having a maximum voltage level and a minimum voltage level for providing said change in potential difference;
   capturing at least three samples of said sensing signal, wherein said at least three samples comprises at least one sample captured when said drive signal is at a first voltage level $V_1$ and at least one sample captured when said drive signal is at a second voltage level $V_2$, different from $V_1$;
   forming a sum of said at least three samples, wherein said samples are selected in time such that a noise component is suppressed from said sensing signal when said sum is formed; and
   forming a digital signal from said sum of said at least three samples.

17. The method according to claim 16, wherein said samples are selected in time based on a known property of a noise component such that said noise component is suppressed.

18. The method according to claim 16, further comprising controlling said drive signal to form a pulse train having a frequency equal to a multiple of a frequency of a known noise component.

19. The method according to claim 16, further comprising, for a noise component comprising a square wave having a known frequency, controlling said drive signal to be a pulse train being out of phase with said noise component.

20. The method according to claim 16, further comprising giving each sample a weight depending on the relative amplitude of the noise signal at the sampling time for the respective sample, wherein said weights are selected so that a sum of weights for samples captured at said first voltage level of said drive signal is equal to a sum of weights for samples captured at said second voltage level of said drive signal.

21. The method according to claim 16, wherein said drive signal comprises at least one square pulse, a square wave, at least one sinc pulse or a sine wave.

22. The method according to claim 21, wherein said first voltage level is a high level of said square pulse and said second voltage level is a low level of said square pulse.

\* \* \* \* \*